(12) United States Patent
Losert

(10) Patent No.: US 12,077,328 B2
(45) Date of Patent: Sep. 3, 2024

(54) METHOD FOR PACKAGING ARTICLES AND PACKAGING SYSTEM FOR ARTICLES SUCH AS BEVERAGE CONTAINERS OR THE LIKE

(71) Applicant: Krones Aktiengesellschaft, Neutraubling (DE)

(72) Inventor: Jens Losert, Reit im Winkl (DE)

(73) Assignee: Krones Aktiengesellschaft, Neutraubling (DE)

( * ) Notice: Subject to any disclaimer, the term of this patent is extended or adjusted under 35 U.S.C. 154(b) by 309 days.

(21) Appl. No.: 17/277,835

(22) PCT Filed: Aug. 21, 2019

(86) PCT No.: PCT/EP2019/072338
§ 371 (c)(1),
(2) Date: Mar. 19, 2021

(87) PCT Pub. No.: WO2020/057883
PCT Pub. Date: Mar. 26, 2020

(65) Prior Publication Data
US 2022/0127029 A1    Apr. 28, 2022

(30) Foreign Application Priority Data
Sep. 20, 2018  (DE) .................. 10 2018 123 106.7

(51) Int. Cl.
*B65B 1/24* (2006.01)
*B65B 21/24* (2006.01)
(Continued)

(52) U.S. Cl.
CPC ............ *B65B 21/242* (2013.01); *B65B 35/36* (2013.01); *B65B 43/145* (2013.01);
(Continued)

(58) Field of Classification Search
CPC ..... B65B 21/242; B65B 35/36; B65B 43/145; B65B 43/265; B65B 43/52; B65B 43/54;
(Continued)

(56) References Cited

U.S. PATENT DOCUMENTS

| 7,549,277 B2 | 6/2009 | Brintazzoli |
| 9,789,983 B2 | 10/2017 | Brandhorst et al. |

(Continued)

FOREIGN PATENT DOCUMENTS

| CN | 107600569 A | 1/2018 |
| CN | 107745847 A | 3/2018 |

(Continued)

OTHER PUBLICATIONS

Machine translation of EP-3272657-A1 (Year: 2018).*
(Continued)

*Primary Examiner* — Thomas M Wittenschlaeger
*Assistant Examiner* — Himchan Song
(74) *Attorney, Agent, or Firm* — Simmons Perrine Moyer Bergman PLC

(57) ABSTRACT

Disclosed is a method for packaging articles (2). Outer packages (3) are moved by a first conveying device (10) and then by a second conveying device (20), which second conveying device (20) is located next to the first conveying device (10). Furthermore, articles (2) are inserted into an outer package (3), while the outer package (3) is located on the first conveyor (10) and/or the second conveyor (20). The outer packages (3) are received on the first conveyor (10) by format parts (5) and, together with their respective format part (5), are transferred to the second conveyor (20). The outer packages (3), which will be continuously arranged on the format parts until then, will be removed from the format parts (5) together with the inserted articles (2). The format (Continued)

parts (5) will then be returned to the first conveyor (10) for renewed seizure of outer packages (3).

13 Claims, 15 Drawing Sheets

(51) Int. Cl.

| | | |
|---|---|---|
| *B65B 35/36* | (2006.01) | |
| *B65B 43/14* | (2006.01) | |
| *B65B 43/26* | (2006.01) | |
| *B65B 43/52* | (2006.01) | |
| *B65B 43/54* | (2006.01) | |
| *B65B 59/00* | (2006.01) | |
| *B65B 65/00* | (2006.01) | |
| *B65G 47/52* | (2006.01) | |
| *B65G 47/82* | (2006.01) | |

(52) U.S. Cl.
CPC ............ *B65B 43/265* (2013.01); *B65B 43/52* (2013.01); *B65B 43/54* (2013.01); *B65B 59/005* (2013.01); *B65B 65/003* (2013.01); *B65G 47/52* (2013.01); *B65G 47/82* (2013.01); *B65G 2201/025* (2013.01); *B65G 2201/0261* (2013.01)

(58) Field of Classification Search
CPC ..... B65B 59/005; B65B 65/003; B65G 47/52; B65G 47/82; B65G 2201/025; B65G 2201/0261
See application file for complete search history.

(56) References Cited

U.S. PATENT DOCUMENTS

| | | |
|---|---|---|
| 10,549,878 B2 | 2/2020 | Ickert et al. |
| 2003/0136086 A1 | 7/2003 | Kalany et al. |
| 2005/0227843 A1 | 10/2005 | Brintazzoli |
| 2015/0013277 A1* | 1/2015 | Brandhorst ............ B65B 35/52 53/244 |
| 2015/0329231 A1* | 11/2015 | Moncrief ................ B65B 5/06 53/543 |
| 2016/0207658 A1* | 7/2016 | Bellante ................ B65B 35/10 |
| 2016/0236809 A1 | 8/2016 | Ickert et al. |

FOREIGN PATENT DOCUMENTS

| | | | |
|---|---|---|---|
| EP | 3006356 A1 | 4/2016 | |
| EP | 3075668 A1 | 10/2016 | |
| EP | 3272657 A1 * | 1/2018 | ............. B65B 43/52 |

OTHER PUBLICATIONS

PCT Application: PCT/EP2019/072338 filed Aug. 21, 2019—International Preliminary Report on Patentability dated Apr. 1, 2021.
Anonymous: "XTS revolutionized mechanical engineering in packaging industry", PC Control Magazin Packaging-Special 2014, May 1, 2014 (May 1, 2014), pp. 1-60, XP055478181, Found on the Internet: URL: https://www.pc-control.net/pdf/special_packaging_2014/pcc_special_packaging_2014_d.pdf (found am May 24, 2018) p. 16-p. 16.
Filmclip: Kanal Youtube, iTRAK Customer CAMA's IF318 launch, MagneMotion, am Nov. 28, 2016 released, URL: https://www.youtube.com/watch?v=EOovOrfH0CM (retrieved am May 29, 2019).
Filmclip: Kanal Youtube, Khs K400 Machine using iTRAK System, Rockwell Automation, am Mar. 11, 2015 released, URL: https://www.youtube.com/watch?v=KNpaXStMSD8 (retrieved am May 29, 2019).
Filmclip: Kanal Youtube, Packing Robot from Schubert with fully automatic Tool Change, Gerhard Schubert GmnH Packaging Machines, am Feb. 5, 2013 released, URL: https://www.youtube.com/watch?v=3RyJfs4uZOM (retrieved am May 29, 2019).
Filmclip: Kanal Youtube, TLM 1500 with Festo MCS, elcom Germany, am Oct. 14, 2016 released, URL: https://www.youtube.com/watch?v=PAP9EHKvGNc (retrieved am May 29, 2019).
PCT Application: PCT/EP2019/072338 filed Aug. 21, 2019—International Search Report dated Mar. 24, 2020.
PCT Application: PCT/EP2019/072338 filed Aug. 21, 2019—Partial Search Report dated Dec. 12, 2019.
Priority Application: DE 10 2018 123 106.7 filed Sep. 20, 2018—German Search Report dated May 29, 2019.
First Chinese Office Action dated Nov. 18, 2021.

* cited by examiner

METHOD FOR PACKAGING ARTICLES AND PACKAGING SYSTEM FOR ARTICLES SUCH AS BEVERAGE CONTAINERS OR THE LIKE

CLAIM OF PRIORITY

The present application claims priority to International Application PCT/EP2019/072338, filed Aug. 21, 2019, which in turn claims priority to German Application DE 10 2018 123 106.7, filed Sep. 20, 2018, which are incorporated by reference.

FIELD OF THE INVENTION

The present invention relates to a method for packaging articles and a packaging system for articles such as beverage containers or the like.

A handling of articles or the dealing with articles often involves providing individual articles or a plurality of articles with an outer package, which outer package can be a container or an enclosure. In the case of individual articles, such a provision with an outer packaging is carried out for their improved protection and/or sales presentation. In the case of several articles, the outer package additionally forms a packaging unit, in which the individual articles can be protected by the outer package from damage during transport, which outer package acts as part of the packaging unit. This is particularly the case if the outer package is a cardboard box, in which cardboard box several articles are completely accommodated. Thus, such packaging units provide an effective way of enabling the simultaneous handling of several articles, in particular to facilitate the transport of a plurality of articles.

BACKGROUND OF THE INVENTION

Folding cartons are often used as outer package for accommodating several articles because they offer fairly good protection for the articles contained within them, they are stackable with the articles accommodated inside and also enable the articles they contain to be identified by information printed or glued onto the outer side. They can also be used as an advertising medium by respective information or printing on the outer side.

Folding cartons are industrially prefabricated containers, usually in a cuboid shape, that are folded or collapsed to a particularly small space size or pack size. They are transported and stored in a space-saving manner in this collapsed condition until they are needed for their intended purpose. They can be unfolded as outer package with simple hand movements or by machine, as it is known, for example, for folding cartons used for postal packages. In their folded state, such folding cartons or folding boxes require relatively little space for transport and storage.

After such outer packages have been unfolded, in the practice of producing packaging units known until now they are moved forward without interruption, whereby during the uninterrupted movement articles are inserted into the unfolded outer packages and the unfolded outer packages are closed after the insertion of the articles. For the purpose of transport or uninterrupted movement of the outer packages, conveying chains are used, with which conveying chains the outer package are in surface contact and which conveying chains slidingly push the outer package along a conveying section or transport section.

Practical experience has shown that outer packages can get dirty due to contact with the conveying chains or with sliding elements arranged on the conveying chains, which can unintentionally impair its external appearance. It is also possible that the outer package may get dirty and/or damaged due to the sliding movement along the conveying section or transport section, which may also unintentionally affect the outer appearance. This is particularly the case if the outer package has a light-colored outer surface and/or a shiny or reflective outer surface.

For this reason, one object of the invention can be seen in providing a possibility which at least partially avoids the mentioned disadvantages.

The above object is achieved by the objects that include the features in the independent claims. Further advantageous embodiments are described by the dependent claims.

SUMMARY OF THE INVENTION

The invention concerns a method for packaging articles. The articles, which can be packaged by the method, can basically be almost any article that needs to be handled and packaged. In particular, the articles mentioned can be liquid containers such as beverage containers, beverage cans or even packs comprising several articles or several beverage containers or several beverage cans.

One step of the method involves moving outer packages over a first conveying device and temporally following this moving the outer packages over a second conveying device, which second conveying device is located next to the first conveying device. Optionally, the first and second conveying devices can be arranged or run parallel or approximately parallel next to each other, which, however, is by no means to be regarded as a mandatory configuration in connection with the method according to the invention. The first conveying device and/or the second conveying device may each comprise at least one belt drive and/or chain drive, which is/are driven in circulation in order to move the outer packages.

For various embodiments it is conceivable, that the second conveying device is spaced apart from the first conveying device in a direction, which direction is oriented perpendicular to a direction of movement of the outer packages on the first conveying device or on the second conveying device, as the case may be. It is conceivable, for example, that the first conveying device and the second conveying device are arranged at a distance from each other in such a way, that a gap is formed between the first conveying device and the second conveying device. It is also conceivable, that the first conveying device and the second conveying device are arranged at a distance from each other, whereby a transfer plate or similar connecting conveying device element is located between the first conveying device and the second conveying device.

The following embodiments have also proved their worth, in which the first conveying device and the second conveying device are arranged next to each other in such a way, that a format part together with a respectively received outer package, which format part is described in the following, can be pushed directly from the first conveying device onto the second conveying device. It is possible that a respective format part described below is pushed from the second conveying device directly onto the first conveying device and is thereby returned from the second conveying device to the first conveying device for the renewed acceptance of outer packages.

Furthermore, it is intended to insert articles into a respective outer package while the respective outer package is on the first conveying device and/or while the respective outer package is on the second conveying device. In particular, it is possible that articles are inserted into a respective outer package, while the respective outer package is being moved on the first conveying device and/or on the second conveying device. At least one handling device equipped for inserting articles into the outer package may be provided, which handling device inserts articles into a respective outer package.

It is conceivable, for example, that articles are only inserted into outer packages, which outer packages are located on the second conveying device or which outer packages have already been transferred from the first conveying device to the second conveying device. Articles can be inserted into a respective outer package in a direction coming from above, whereby the outer packages are open at least in an upper section during insertion of the articles.

The outer packages are received on the first conveying device by format parts and together with their respective format part are transferred to the second conveying device, which second conveying device is located next to the first conveying device. Furthermore, the outer packages that have been arranged on the format parts up to this point are removed from the format parts together with the inserted articles and the format parts are then returned to the first conveying device for renewed seizure of outer packages. Accordingly, the format parts can be moved endlessly along a closed and circulating path, whereby each format part seizes an outer package each for the production of a packaging unit during a respective circulation along the closed path.

The format parts can thus be moved endlessly along a closed and circulating path, whereby a format part seizes an outer package for the production of a packaging unit during a respective circulation along the closed path and whereby several articles, preferably formed by beverage containers, are inserted or introduced into a respectively seized outer package during a respective circulation along the closed path.

Accordingly, the format parts can be moved endlessly along a closed and circulating path, whereby a packaging unit each is formed on each format part during a respective circulation along the closed path.

It is possible that the format parts together with their seized outer packages are transposed from the first conveying device to the second conveying device and/or that the format parts together with their received outer packages are pushed from the first conveying device to the second conveying device.

Furthermore, it is possible, that the first conveying device has several retaining devices that are guided in a circulating manner, whereby at least one format part is fixed in a clamping manner to the first conveying device system via two directly successive retaining devices of the first conveying device system. Alternatively, or in addition to this, it may be the provided, that the second conveying device has a plurality of circulatingly guided retaining devices, wherein at least one format part transferred from the first conveying device to the second conveying device is fixed in a clamping manner to the second conveying device via two directly successive retaining devices.

In addition, it is possible that the format parts receive the outer packages in a form-fitting manner and hold them in a form-fitting manner until the respective outer package is removed from the respective format part.

In addition, embodiments have proven successful, in which, depending on the dimensions of the outer package to be seized by the format parts, specific format parts are selected from several different format parts and are arranged on the first conveying device, which specific format parts correspond to the outer package to be seized.

It is also possible that format parts are moved along a first transport direction on the first conveying device and that format parts transferred to the second conveying device are moved along a second transport direction, whereby the first transport direction and the second transport direction run parallel and opposite to each other.

The invention furthermore relates to a packaging system for articles such as beverage containers or the like. Features which have already been described above for various embodiments of the method may also be intended for various embodiments of the packaging system described below and are not mentioned several times. Likewise, features described below, which concern various embodiments of the packaging system, may also be provided for embodiments of the method already described.

The packaging system has a first conveying device and a second conveying device, each of which is equipped to move outer packages and which are arranged next to each other.

Furthermore, the packaging system comprises at least one handling device equipped for inserting articles into outer packages, the working area of which extends over the first conveying device and/or over the second conveying device. The at least one handling device equipped for inserting articles into outer packages can be designed, for example, as a portal system and/or as a multi-axis robot and/or as a delta kinematics robot.

The packaging system comprises several format parts, which several format parts can receive outer packages for the insertion of articles and which are equipped for detachable arrangement on the first conveying device and the second conveying device.

Furthermore, the packaging system comprises at least one manipulation device, which manipulation device can transfer format parts together with seized outer package from the first conveying device onto the second conveying device, which manipulation device is arranged next to the first conveying device and which manipulation device is designed to return format parts from the second conveying device to the first conveying device.

It is possible that the at least one manipulation device is equipped or prepared for returning empty format parts from the second conveying device to the first conveying device, on which empty format parts no packaging unit is located.

It is also possible that the at least one manipulation device is equipped or prepared for returning format parts from the second conveying device to the first conveying device, whereby an already completely formed packaging unit is arranged on each format part.

The first conveying device, the second conveying device and at least one manipulation device can thus cooperate as a rotary machine for format parts. In particular, it is conceivable that the first conveying device, the second conveying device as well as the at least one manipulation device cooperate as a rotary machine for format parts, whereby the at least one handling device can insert articles into outer packages received from the format parts during one rotary movement of the format parts or during a single rotary movement of the format parts.

It is possible, that the at least one manipulation device can transpose format parts together with seized outer packages from the first conveying device to the second conveying device, which second conveying device is located next to the first conveying device. Alternatively, or in addition to this, it is possible that the at least one manipulation device can push format parts together with seized outer packages from the first conveying device to the second conveying device.

The first conveying device can also have several circulatingly guided retaining devices, whereby at least one format part can be fixed in a clamping manner to the first conveying device via two directly successive circulatingly guided retaining devices of the first conveying device. Furthermore, the second conveying device can have a plurality of circulatingly guided retaining devices, wherein at least one format part transferred from the first conveying device to the second conveying device can be fixed to the second conveying device in a clamping manner via two directly successive circulatingly guided retaining devices of the second conveying device.

It is also conceivable that the format parts are equipped to hold seized outer packages in a form-fitting manner. In this case, it is possible, that the format parts each comprise a circumferential marginal region forming a lateral boundary for a respectively seized outer package, over which marginal region the format parts are designed to hold seized outer package in a form-fitting manner.

It is also possible that the packaging system comprises a plurality of different format parts, which different format parts are adapted to different dimensions of several different outer packages and which different format parts can be selectively arranged on the first conveying device system depending on the respective dimensions of the outer packages to be seized. In particular, the format parts can be made of aluminum and/or plastic. It is conceivable hereby, that the format parts are each formed in one piece.

The first conveying device can be designed to transport format parts along a first transport direction. The second conveying device can be designed to transport format parts along a second transport direction, whereby the first transport direction and the second transport direction run parallel and opposite to each other.

It should be explicitly mentioned at this point, that all aspects and embodiment variants which were explained in connection with the packaging system according to the invention equally concern or may constitute partial aspects of the inventive method for packaging articles. Therefore, if at any point in the description or also in the claim definitions relating to the packaging device or packaging system that is subject of the invention, certain aspects and/or interrelationships and/or effects are mentioned, these shall equally apply to the method that is subject of the invention. In the contrary way the same applies, so that all aspects and embodiment variants that have been explained in connection with the inventive method also equally concern or can be partial aspects of the packaging device or packaging system. Therefore, if at any point in the description or also in the claim definitions relating to the inventive method certain aspects and/or interrelationships and/or effects are mentioned, this equally applies to the packaging device or packaging system according to the invention.

BRIEF DESCRIPTION OF THE FIGURES

In the following passages, the attached figures further illustrate exemplary embodiments of the invention and their advantages. The size ratios of the individual elements in the figures do not necessarily reflect the real size ratios. It is to be understood that in some instances various aspects of the invention may be shown exaggerated or enlarged to facilitate an understanding of the invention.

Even if in the context of the figures there is generally talk of "schematic" representations and views, this does not in any way mean that the figure representations and their description should be of secondary importance with respect to the disclosure of the invention. The skilled person is quite capable of extracting enough information from the schematic and abstractly drawn representations to make it easier for him to understand the invention without being impaired in his understanding in any way by the drawn and possibly not exactly scaled proportions. The figures thus enable the skilled person as reader to derive a better understanding of the inventive idea formulated in the claims as well as in the general part of the description in more general and/or abstract terms on the basis of the more concretely explained embodiments of the inventive method and the more concretely explained functioning of the packaging system according to the invention.

FIGS. 5 to 9 show individual steps as they may be provided for in various embodiments of the method according to the invention.

FIGS. 10 to 12 show further aspects as they may be provided for in various embodiments of the method according to the invention.

Figure 1:
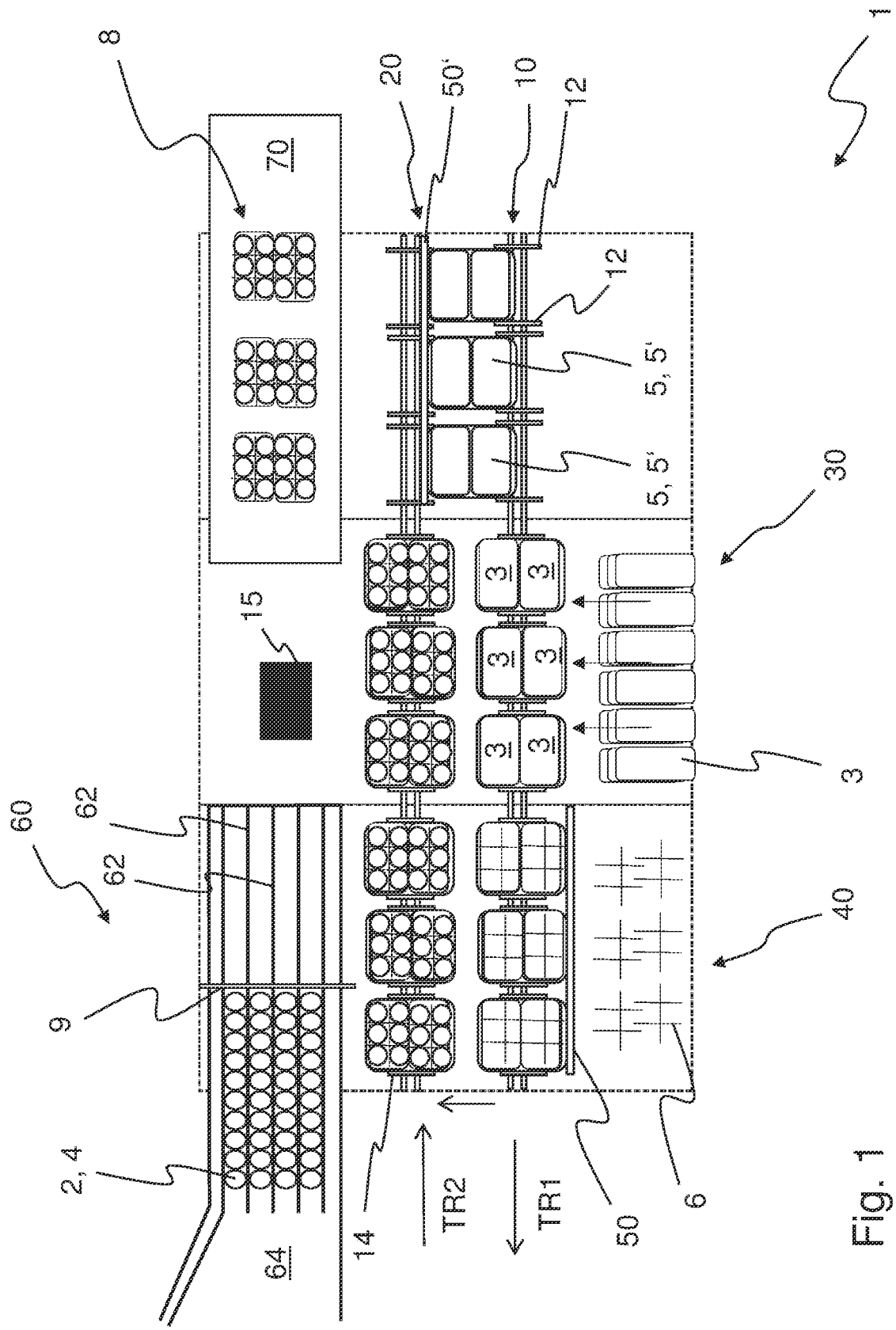
FIGS. 1 to 3 show a schematic view of a first embodiment of a packaging system according to the invention as well as individual steps as they may be provided for in various embodiments of the method according to the invention.

The same or equivalent elements of the invention are designated by identical reference characters. Furthermore, and for the sake of clarity, only the reference characters relevant for describing the respective figure are provided. It should be understood, that the embodiments described are only examples describing an embodiment of the device and/or method according to the invention. They are not intended to limit the scope of the disclosure.

DETAILED DESCRIPTION OF THE INVENTION

The schematic top view of FIG. 1 shows a schematic view of a first embodiment of a packaging system 1 according to the invention. Articles 2, which in this case are formed or can be formed by beverage containers 4, can be packaged via the packaging system 1. The packaging system 1 comprises a first conveying device 10 and a second conveying device 20, which are arranged side by side and which are shown in detail in FIGS. 13 and 14. The first conveying device 10 has several retaining devices 12, which are circulatingly guided, whereby a format part 5 can be fixed in a clamping manner to the first conveying device 10 between two directly successive retaining devices 12 of the first conveying device 10. For example, the first conveying device 10 can comprise at least one circulatingly guided chain drive and/or belt drive, on which chain drive and/or belt drive the retaining devices 12 are arranged.

Figure 2:
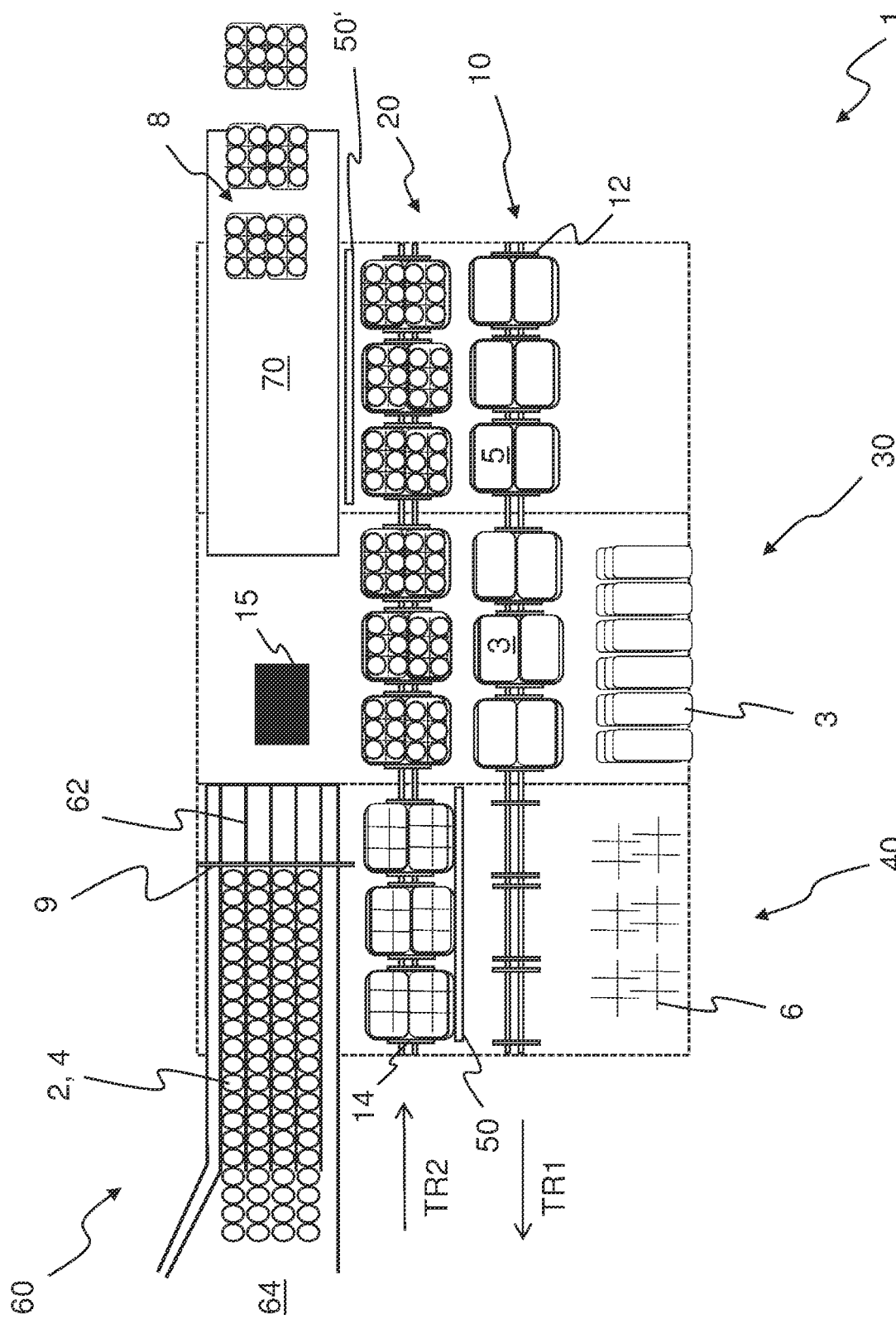

In the embodiment variant shown in FIG. 1, format parts 5 are returned from the second conveying device 20 to the first conveying device 10, whereby in FIG. 1 the format parts 5 have not yet been completely transferred to the second conveying device 20, meanwhile in FIG. 2 they have already been completely transferred from the second conveying device 20 to the first conveying device 10 and are held in a clamping manner between directly successive retaining devices 12 of the first conveying device 10.

Figure 3:
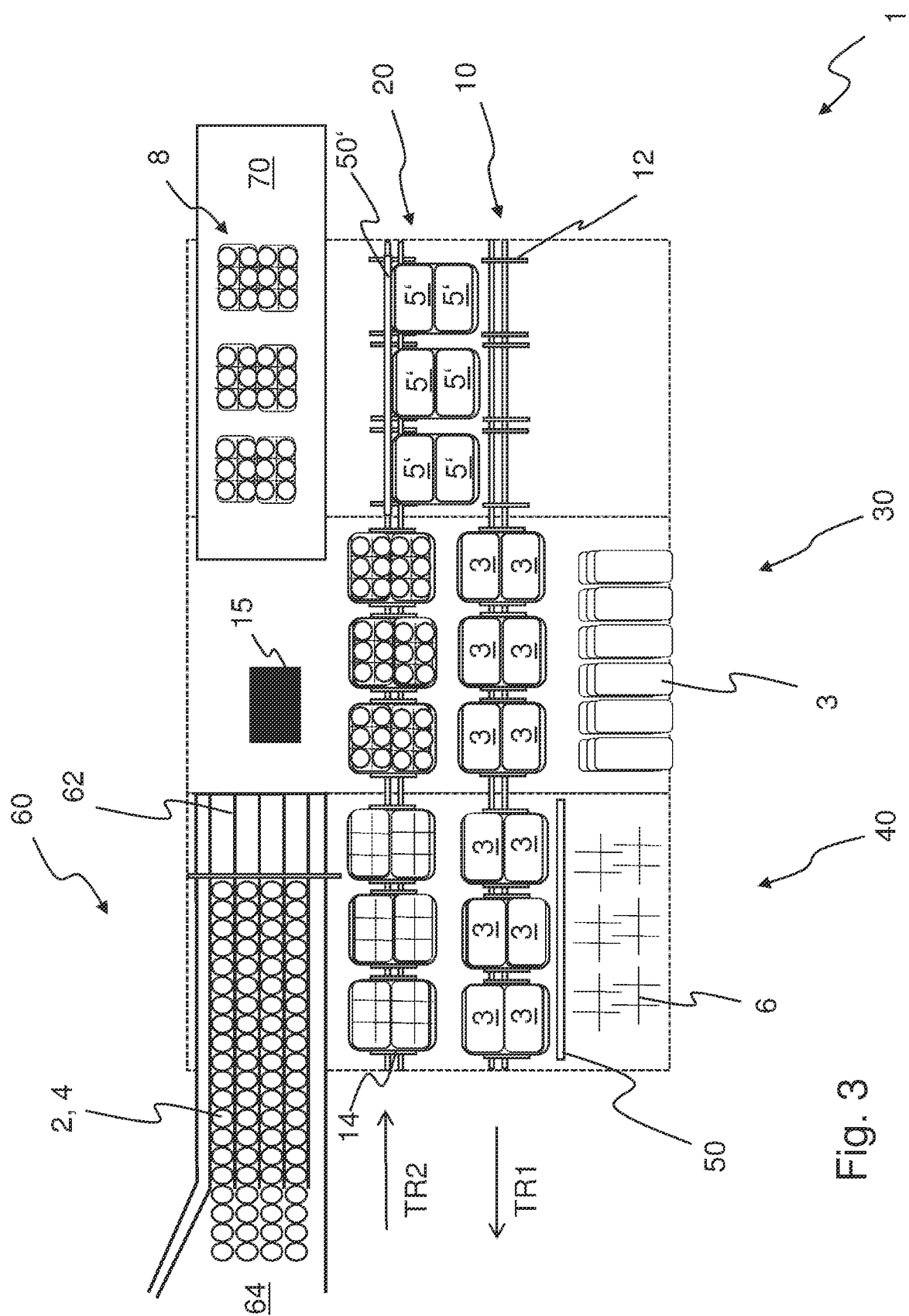

The reference number 30 in FIGS. 1 to 3 denotes a first magazine, in which a large number of outer packages 3 is accommodated. The outer packages 5 are removed from magazine 30 or from the first magazine 30 by a handling device, which handling device is not shown in the illustration, and the outer packages 5 are received by the format parts 5, which format parts 5 are still fixed in a clamping manner to the first conveying device 10 via the retaining devices 12. In the first magazine 30, the outer packages 3 are still folded. During the transfer to the first conveying device 10 or during a transfer to the format parts 5, which format parts 5 are moved by the first conveying device 10, the outer packages 3 are pulled up by the handling device. In addition, the format parts 5, which format parts 5 are being moved by the first conveying device 10, are moved without interruption in a transport direction TR1 meanwhile the pulled up outer packages 3 are being placed on the format parts 5, which transport direction TR1 is provided by the first conveying device 10 for moving the format parts 5 and for moving the outer packages 3, which are seized and pulled up by the format parts 5.

The illustration in FIG. 1 also shows that the size of format parts 5 is adapted to the size of the pulled up outer packages 3 or that the size of format parts 5 corresponds to the size of the pulled up outer packages 3. As additionally described in FIG. 15, the format parts 5 are each designed with a marginal area 16, by which marginal area 16 the pulled up outer packages 3 can be held in a form-fitting manner or can be held essentially in a form-fitting manner after seizure by a respective format part 5.

The packaging system 1 furthermore comprises a second magazine 40, which holds a variety of compartments 6. The compartments 6 are removed from the second magazine 40 and are inserted into the pulled up outer packages 3, which are still arranged on the format parts 5. The removal of compartments 6 from the second magazine 40 and the arrangement of the removed compartments 6 within the pulled up outer packages 3 can be carried out by the handling device described above, which handling device removes outer packages 3 from the first magazine 30, pulls them up and places them on the format parts 5. It is also conceivable, that a further handling device is provided for this purpose, which further handling device takes compartments 6 from the second magazine 40 and inserts them into the outer packages 3 that have already been pulled up and are still located on format parts 5, which format parts 5 are moved by the first conveying device 10.

By the respective compartment 6, several chambers are formed within the respective outer package 3, whereby a respective chamber is provided for the accommodation of a respective article 2 formed by a beverage container 4. At the same time as a respective compartment 6 is inserted into a respective outer package 3, the respective outer package 3 and the respective format part 5, on which the respective outer package 3 continues to stand, are moved along the first transport direction TR1 without interruption.

After a respective compartment 6 has been inserted into a respective outer package 3, the respective outer package 3 is transferred from the first conveying device 10 to the second conveying device 20 together with the format part 5, on which format part 5 the outer package 3 continues to stand. For this purpose, immediately after a respective compartment 6 has been inserted into a respective outer package 3, a pusher bar 50 comes into surface contact with several format parts 5 and/or with several outer packages 3, into which outer packages 3 a respective compartment 6 has already been inserted, and pushes the several format parts 5 and the outer package 3 still arranged thereon perpendicularly to the first transport direction TR1, so that the respective format parts 5 and the outer package 3 still arranged thereon are moved in the direction of the second conveying device 20 or are pushed in the direction of the second conveying device 20.

In this respect, embodiments have proven to be effective, in which the pusher bar 50 comes into surface contact with the several format parts 5, whereby no surface contact is provided between the pusher bar 50 and the respective outer packages 3, so that the respective format parts 5 are moved or pushed in the direction of the second conveying device 20 without surface contact of the pusher bar 50 to the outer packages 3, which outer packages 3 are still arranged on the format parts 5. In this way, an unintentional contamination of the outer packages 3 can be counteracted, which contamination may be caused by surface contact with the pusher bar 50.

The pusher bar 50 is moved horizontally or exclusively horizontally which means that the format parts 5 in surface contact with the pusher bar 50 glidingly move towards the second conveying device 20. Since only the format parts 5 have surface contact with the first conveying device 10 or the second conveying device 20 during such a movement, no static and/or sliding friction is formed between the outer packages 3 and the first conveying device 10 and between the outer packages 3 and the second conveying device 20. Thereby, it can be avoided, that an underside of a respective outer packages 3 is damaged and/or experiences unwanted optical impairments during transfer from the first conveying device 10 to the second conveying device 20, during a movement by the first conveying device 10 and during a movement over the second conveying device 20.

The second conveying device 20 also has a large number of retaining devices 14, which hold a respective format part 5 in a clamping manner after it has been transferred from the first conveying device 10 to the second conveying device 20.

A further component of the packaging system 1 is formed by an infeed 60 with a horizontal conveying device 64 and several lane separators 62 running parallel to one another, between which several lane separators 62 running parallel to one another several rows of articles 2 arranged one behind the other or several rows of beverage containers 4 arranged one behind the other are guided parallel to one another. A respective article 2 or a respective beverage container 4 arranged first within a respective row is in surface contact with a support bar 9. The support bar 9 is moved parallel to a second transport direction TR2, along which second transport direction TR2 the second conveying device 20 moves format parts 5 with outer packages 3 still arranged thereon and each outer package 3 already comprising an inserted compartment 6. A speed of movement of the support bar 9 is reduced in comparison with a transport speed of the horizontal conveying device 64, which horizontal conveying device 64 is a component of the infeed 60, so that articles 2 of a respective row or beverage containers 4 of a respective row accumulate at the support bar 9.

A handling device, marked with the reference number 15 and only schematically shown or indicated herein, seizes several articles 2 or several beverage containers 4 of the parallel rows from the infeed 60 and subsequently deposits one article 2 or one beverage container 4 in one chamber each, which chambers are formed by the compartment 6 within an outer package 3. The articles 2 or the beverage containers 4 are then form-fittingly or substantially form-fittingly accommodated in the chambers formed by the respective compartment 6 of a respective outer package 3. During the depositioning of the articles 2 or the beverage containers 4 within the respective chamber, the format part 5, which has already been transferred to the second conveying device 20, is moved along the second transport direction TR2 without interruption together with the outer package 3, which outer package 3 is still standing on the format part 5 and is comprising the inserted compartment 6. The respective format part 5, which has already been transferred to the second conveying device 20, is still held in place on the second conveying device 20 in a clamping manner by the retaining devices 14 of the second conveying device 20.

An outer package 3 together with the inserted compartment 6 and the inserted articles 2 or the inserted beverage containers 4 forms a packaging unit 8. A respective packaging unit 8, which is still located on a format part 5, is then transposed onto the outfeed conveyor belt 70 or pushed onto the outfeed conveyor belt 70. The empty format parts 5' are then returned to the first conveying device 10 for renewed seizure of outer packages 3. For this purpose, another pusher bar 50' can come into surface contact with the empty format parts 5' and push the empty format parts 5' from the second conveying device 20 onto the first conveying device 10. One direction of movement of the further pusher bar 50' is directed against the direction of movement of the pusher bar 50 marked with the reference number 50.

In particular, for returning the format parts 5 or empty format parts 5' from the second conveying device 20 to the first conveying device 10, the further pusher bar 50' can only be moved horizontally. An overview of FIGS. 1 and 2 illustrates the transfer of format parts 5 together with the outer packages 3 and the compartments 6 therein from the first conveying device 10 to the second conveying device 20. An overview of FIGS. 1 and 2 also illustrates the return of empty format parts 5' from the second conveying device 20 to the first conveying device 10. In FIG. 3, format parts 5 with seized outer packages 3 have already been moved by the first conveying device 10 to a location near the second magazine 40, whereby no compartments 6 have yet been inserted into outer packages 3, which outer packages 3 are located near the second magazine 40 in FIG. 3.

The format parts 5 already transferred to the second conveying device 20 or converted to the second conveying device 20 in FIG. 3 with outer packages 3 located thereon and compartments 6 inserted within the outer packages 3 are located in the vicinity of the infeed 60. In a next step, articles 2 still located on the infeed 60 or beverage containers 4 still located on the infeed 60 are incorporated or inserted into the chambers in the way described above using the handling device 15, which chambers are formed within in the outer packages 3 by the compartments 6.

From a summary of FIGS. 1 to 3 it is clear that the first conveying device 10 and the second conveying device 20 work together as a rotary machine via the pusher bar 50 and the further pusher bar 50', by which rotary machine a respective format part 5 can be moved circulatingly for the successive production of a large number of packaging units 8.

Figure 4:
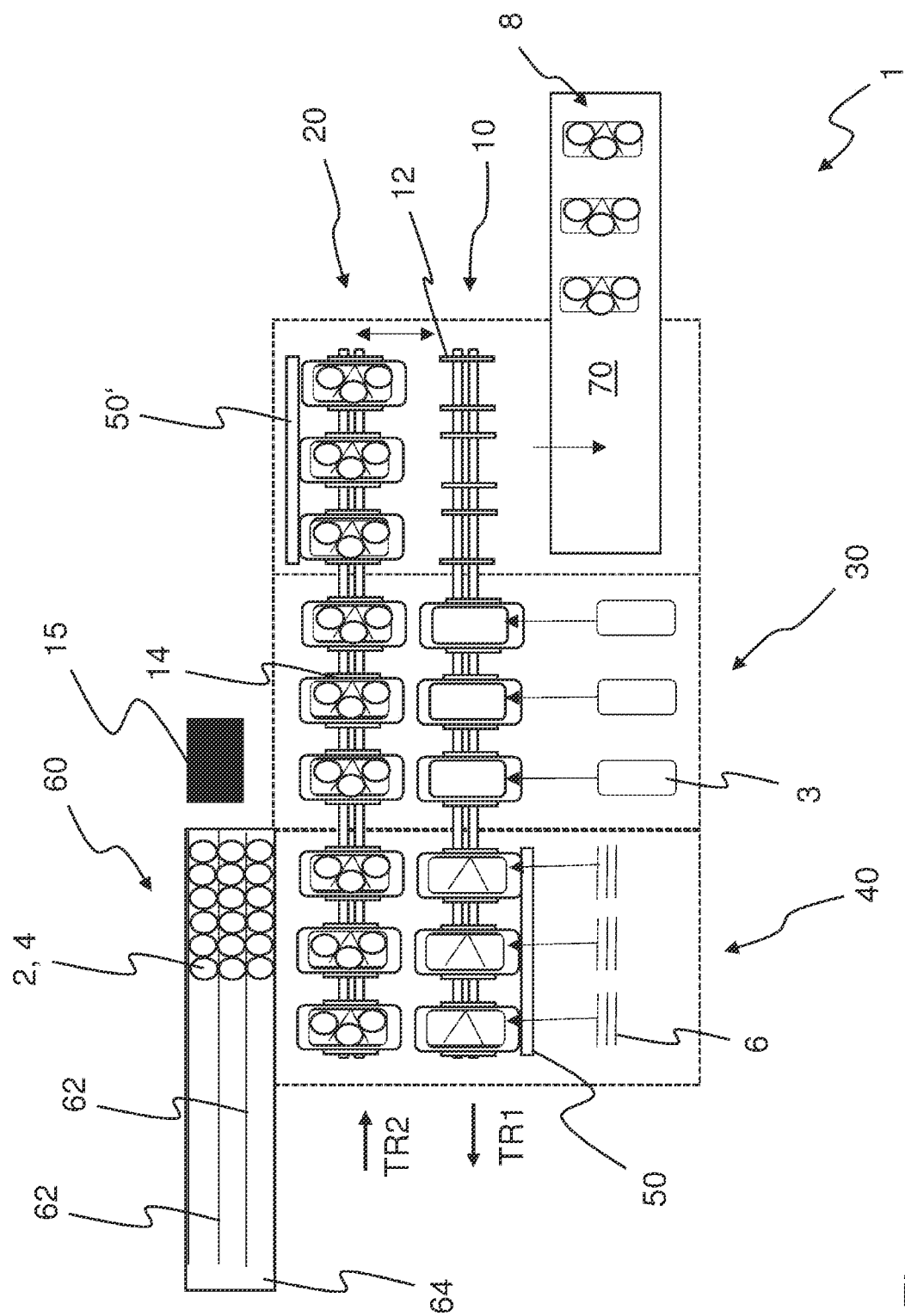
FIG. 4 shows a schematic view of a further embodiment of a packaging system according to the invention and illustrates individual steps as they may be provided for in various embodiments of the method according to the invention.

FIG. 4 shows a schematic view of a further embodiment of a packaging system 1 in accordance with the invention. Compared to the embodiment of a packaging system 1 according to FIGS. 1 to 3, the embodiment of a packaging system 1 according to FIG. 4 differs in particular in the design of the packaging units 8 produced by packaging system 1 and in the position of the outfeed conveyor belt, which is subsequently described and shown using the reference number 70. The compartments, which according to the embodiment in FIG. 4 are also removed from the second magazine 40 and inserted into the outer packages 3 via a handling device, which handling device is not shown, which outer packages 3 are already arranged on the format parts 5, only form three chambers in FIG. 4, which chambers are provided for receiving a respective article 2 or for receiving a respective beverage container 4. Consequently, each packaging unit 8 produced by the packaging system 1 according to FIG. 4 comprises only three articles 2 or three beverage containers 4.

From a comparison of the embodiment according to FIGS. 1 to 3 with the embodiment according to FIG. 4, it is also clear, that in the embodiment according to FIGS. 1 to 3, the outfeed conveyor belt 70 is located immediately adjacent to the second conveying device 20. In FIG. 4, however, the outfeed conveyor belt 70 is located directly adjacent to the first conveying device 10. As already mentioned above for the embodiment shown in FIGS. 1 to 3, the packaging unit 8 formed on the second conveying device 20 is pushed onto the outfeed conveyor belt 70 or transferred to the outfeed conveyor belt 70.

For the embodiment shown in FIGS. 1 to 3, the respective packaging unit 8 formed on the second conveying device 20 is removed from the respective format part 5 and transferred to the outfeed conveyor belt 70 or pushed onto the outfeed conveyor belt 70. Temporally after the removal of the respective packaging unit 8, the empty format part 5' is returned to the first conveying device 10 according to the embodiment shown in FIGS. 1 to 3. In contrast, in the embodiment shown in FIG. 4, the format parts 5 are returned to the first conveying device 10 together with the packaging units 8, which packaging units 8 have been completed already and are still arranged on the format parts 5.

Temporally after the returned format parts 5 together with the packaging units 8 have been received by the first conveying device 10, which packaging units 8 have been completed already and are still arranged on the format parts 5, according to the embodiment shown in FIG. 4 the packaging units 8 which are still arranged on the format parts 5 are removed from the format parts 5 and transferred to the outfeed conveyor belt 70 or pushed onto the outfeed conveyor belt 70. On the format parts 5, which are fixed to the first conveying device 10 in a clamping manner via retaining devices 12, outer packages 3 are arranged again. Also, according to the embodiment shown in FIG. 4, the first conveying device 10 and the second conveying device 20 interact as a rotary machine via the pusher bar 50 and the further pusher bar 50'.

FIGS. 5 to 9 illustrate a functional principle as it may be provided for various embodiments of a packaging system 1 according to the invention. Furthermore, FIGS. 5 to 9 show individual steps as they may be provided for in various forms of implementation of the method according to the invention. For reasons of clarity, only the first conveying device 10, the second conveying device 20, the retaining devices 12 and 14, the pusher bar 50 and the further pusher bar 50' are shown in FIGS. 5 to 9 to illustrate the functional principle or the mode of operation of packaging system 1. The outfeed conveyor belt 70, the infeed 60, the handling device 15 as well as the first magazine 30 and the second magazine 40 are missing in the illustration according to FIGS. 5 to 9, but can be provided in the same way for the operating principle or the mode of operation of packaging system 1 according to FIGS. 5 to 9.

Figure 5:
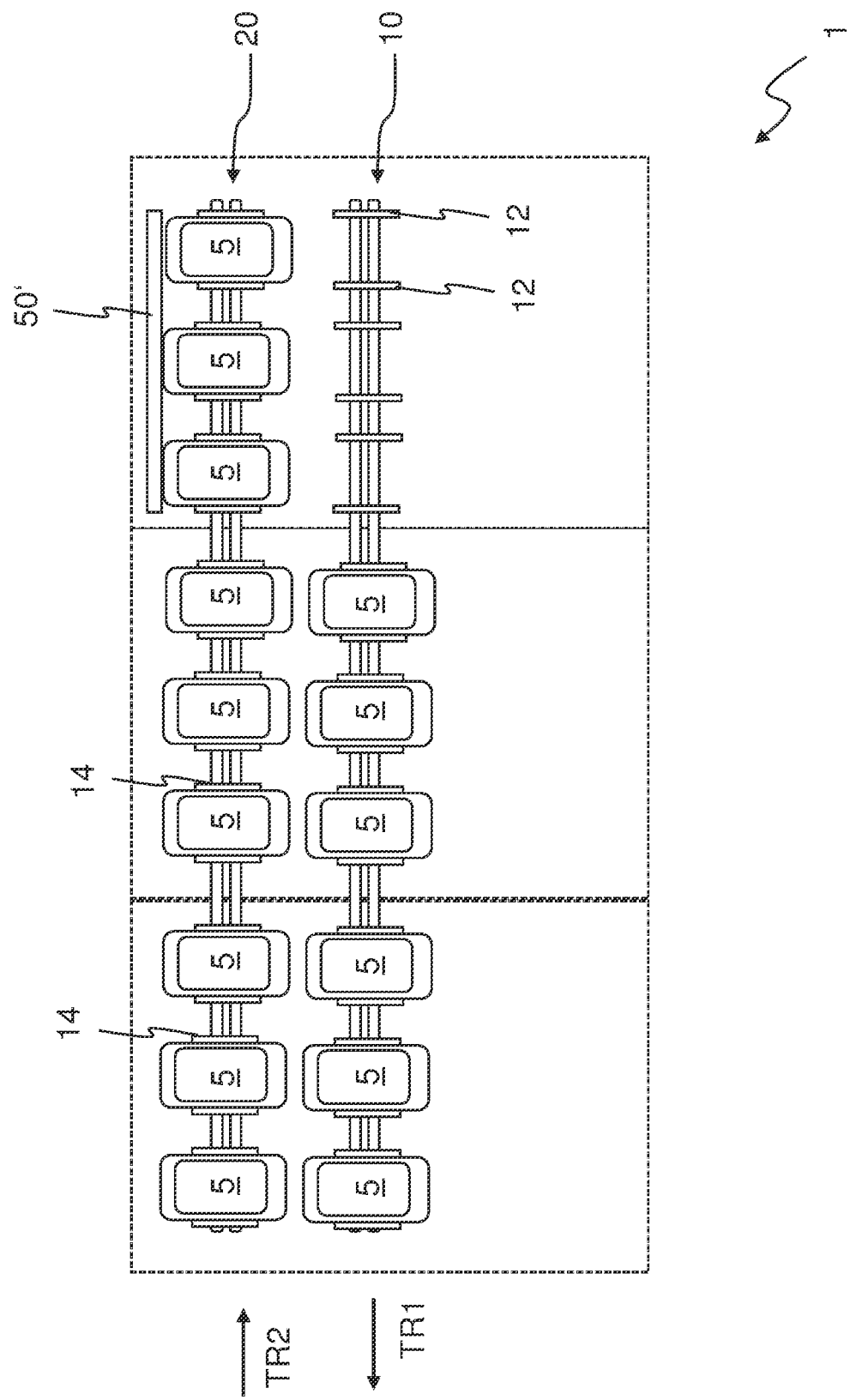
FIGS. 5 to 9 illustrate a functional principle as it may be provided for various embodiments of a packaging system according to the invention. Furthermore.

In the illustration according to FIG. 5, the further pusher bar 50' is already in surface contact with three format parts 5, which are provided to be returned to the first conveying device 10. In FIG. 5 it can be seen that between directly successive retaining devices 12, which are arranged on the first conveying device 10 or are designed as a component of the first conveying device 10, a respective gap is formed, into which gap a respective format part 5 can be inserted, which according to FIG. 5 is still arranged on the second conveying device 20. If a respective format part 5 is to be inserted into the respective gap formed between directly successive retaining devices 12 by the further pusher bar 50', the position of the respective format part 5 must be arranged perpendicular to the transport directions TR1 and TR2 of the first conveying device 10 and the second conveying device 20 and aligning with the gap, which transport directions are oriented parallel to each other. For this purpose, the retaining devices 12 fixed to the first conveying device 10 and the retaining devices 14 fixed to the second conveying device 20 must be arranged on the respective conveying device 10 or 20 in a coordinated manner and/or the first conveying device 10 and the second conveying device 20 must be driven at defined conveying speeds in a coordinated manner.

Figure 6:
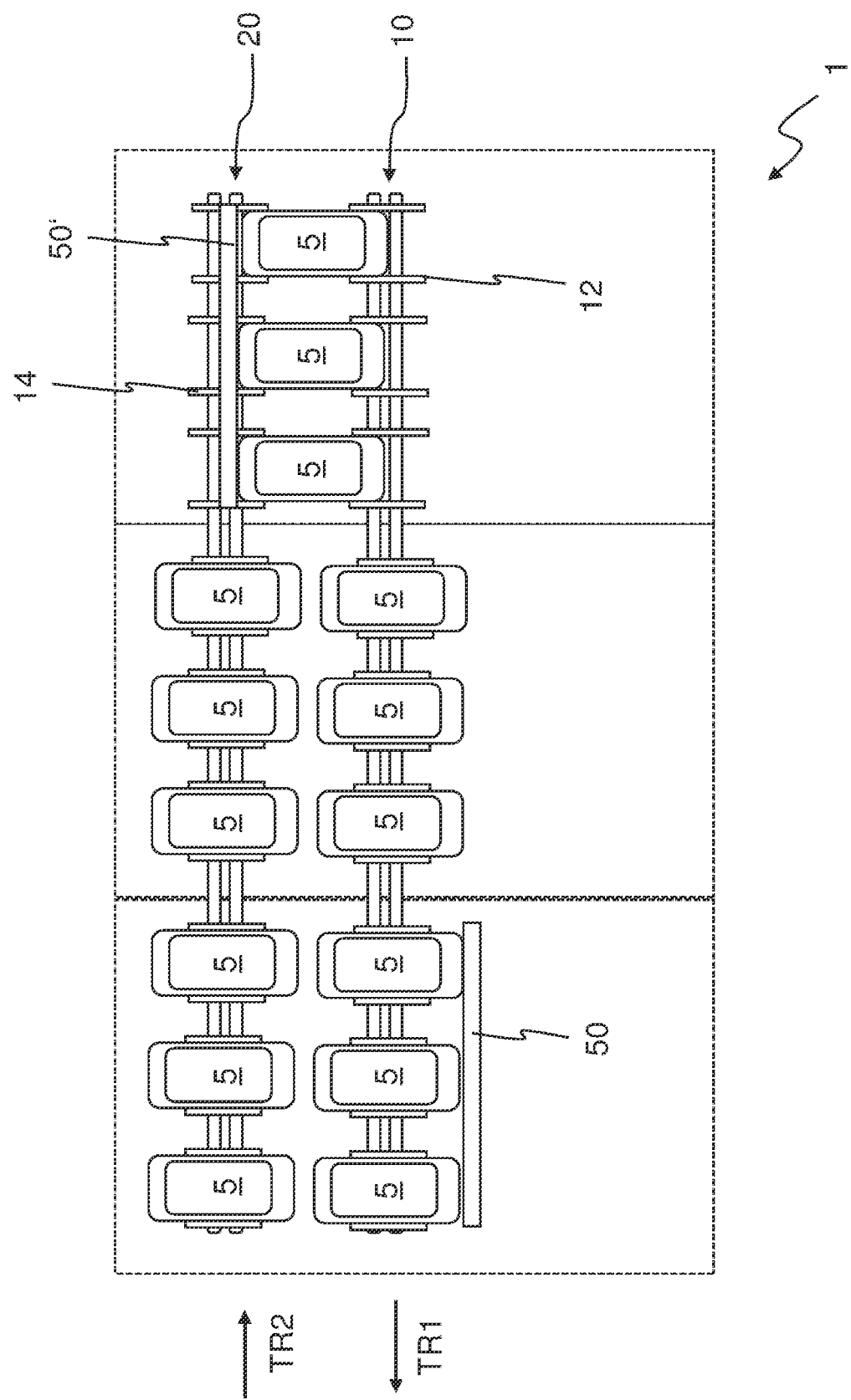
Figure 7:
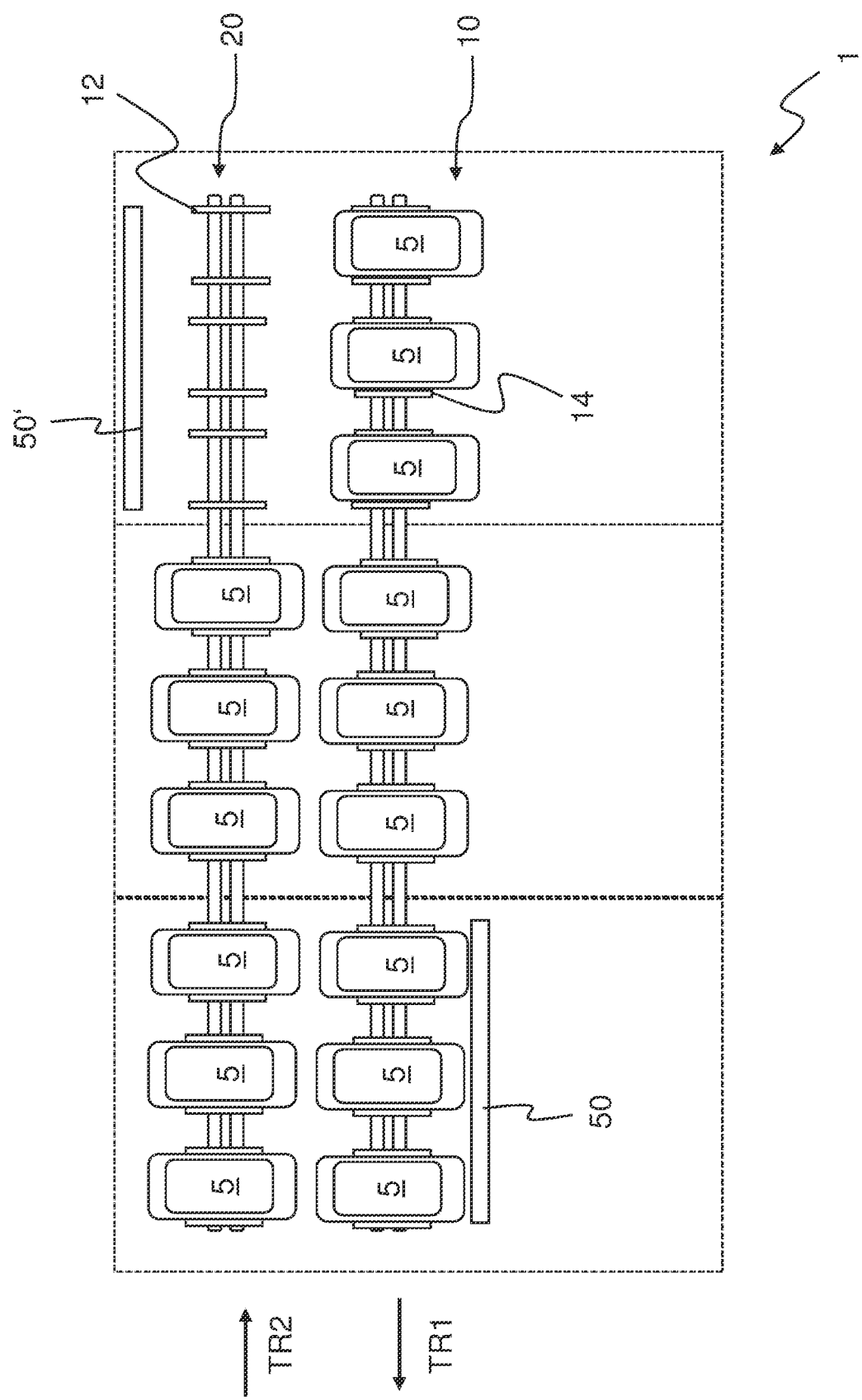

An overview of FIGS. 5 to 7 furthermore shows the return of format parts 5 via the further pusher bar 50'. The further pusher bar 50', which according to FIG. 5 is already in surface contact with several format parts 5, performs a positioning movement for returning format parts 5, which positioning movement is oriented horizontally and vertically to the transport directions TR1 and TR2. In FIG. 7, the further pusher bar 50' has already been moved back in the direction of the second conveying device 20 for renewed return of further format parts 5. The movement of the further pushing bar 50' into the position according to FIG. 7 is also horizontal and vertical to the transport directions TR1 and TR2.

Figure 8:
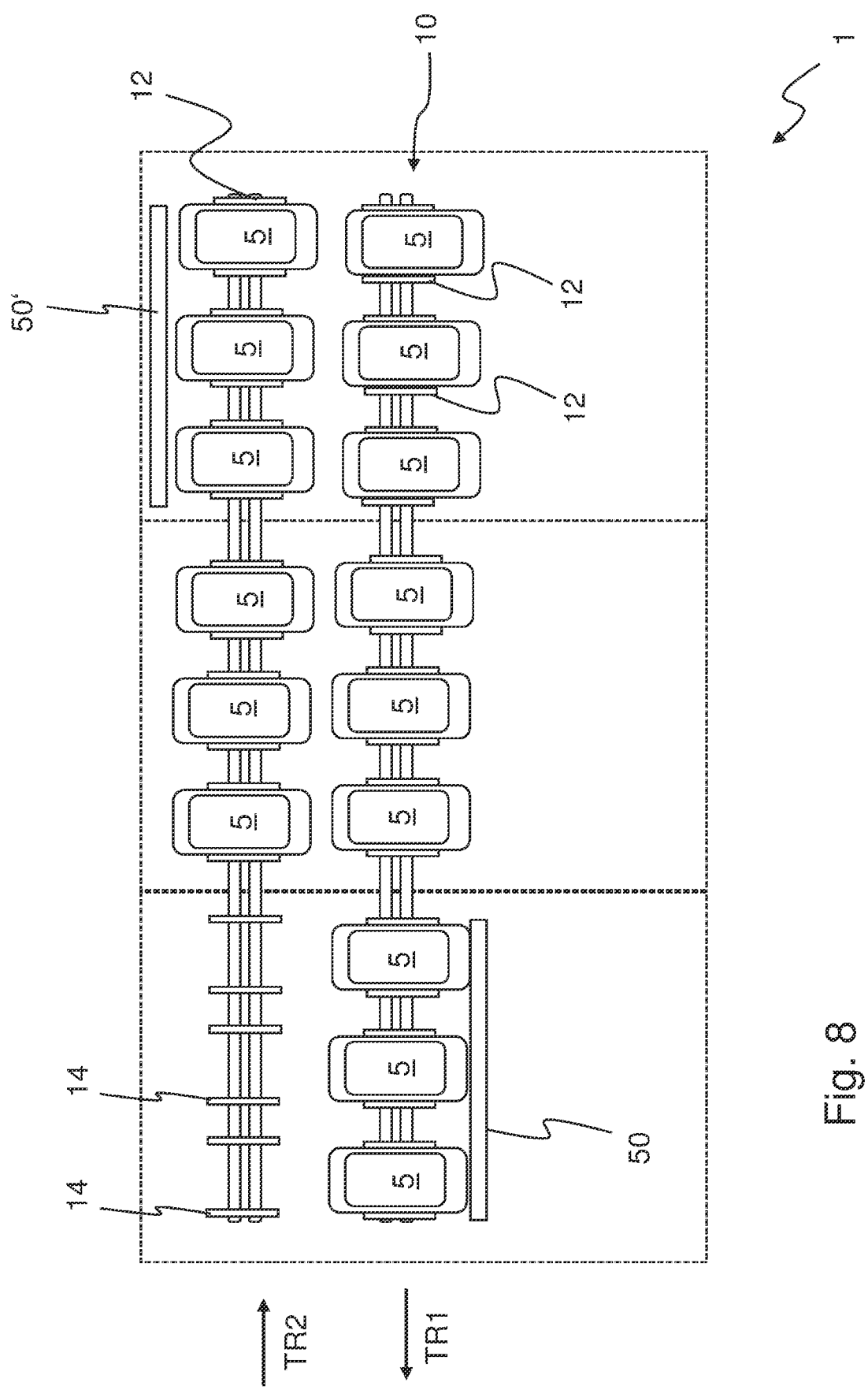
Figure 9:
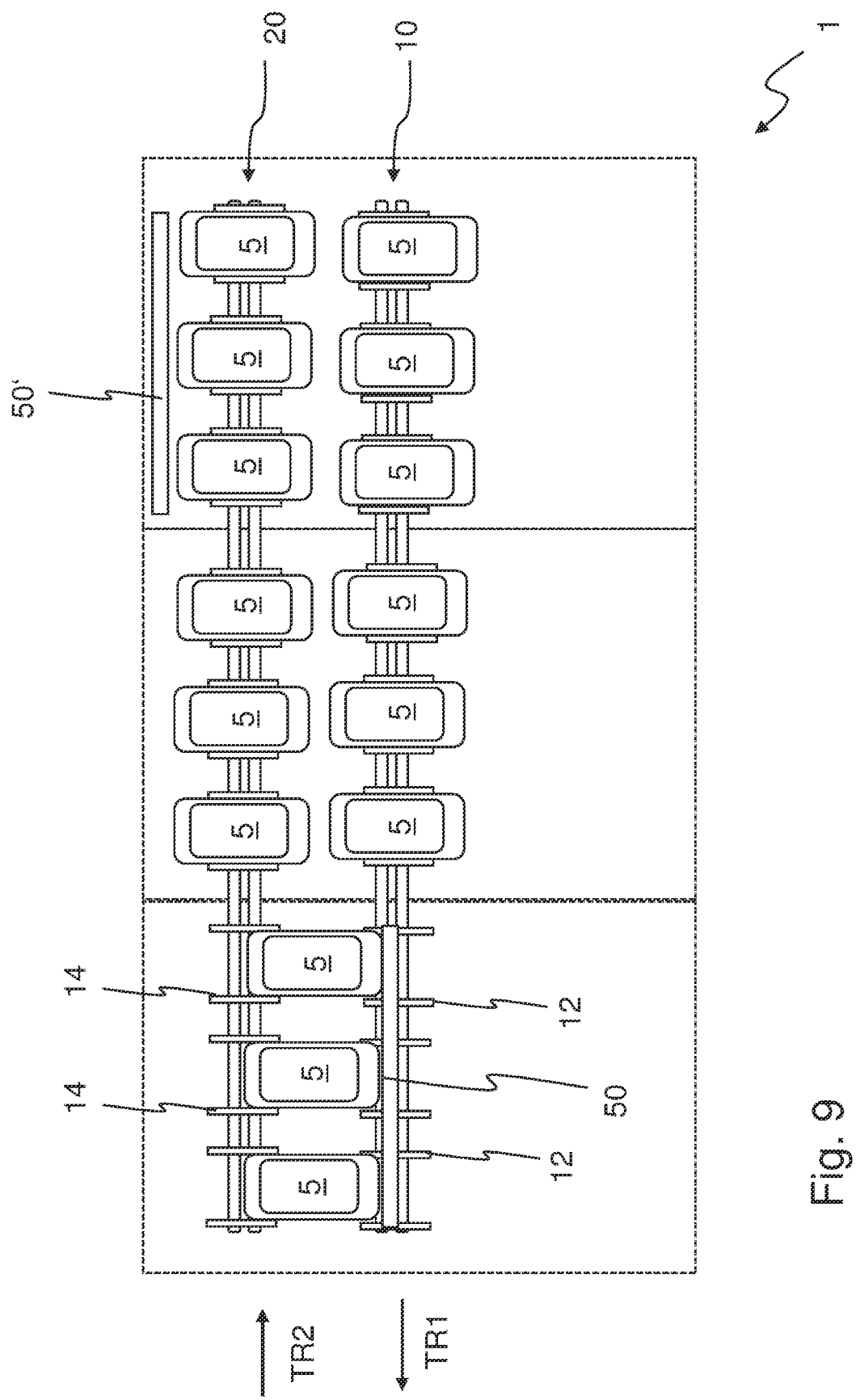

When the return of format parts 5 to the first conveying device 10 has been initiated and not yet completed, the pusher bar 50 already is in surface contact with format parts 5 as shown in FIG. 6 in order to push these format parts 5 together with outer package 3 (see FIGS. 1 to 4) not shown in FIGS. 5 to 9 onto the second conveying device 20. In FIG. 8 it can be seen that gaps are formed between directly successive retaining devices 14, which retaining devices 14 are fixed to the second conveying device 20, into which gaps format parts 5 still fixed in a clamping manner on the first conveying device 10 via retaining devices 12 can be pushed by the pusher bar 50. In FIG. 9, the pushing movement required for this has already been initiated via the pusher bar 50, whereby the format parts 5 still fixed to the first conveying device 10 via retaining devices 12 in a clamping manner move in between the gaps. After complete transfer to the second conveying device 20, the format parts 5 are then fixed in a clamping manner by the retaining devices 14 located on the second conveying device 20. Furthermore, in FIGS. 8 and 9, format parts 5 are already located in a close range of the further pusher bar 50', so that the further pusher bar 50' can push the format parts 5 located in a close range of the further pusher bar 50' onto the second conveying device 20 as shown in FIGS. 6 and 7 in a subsequent step.

Figure 10:
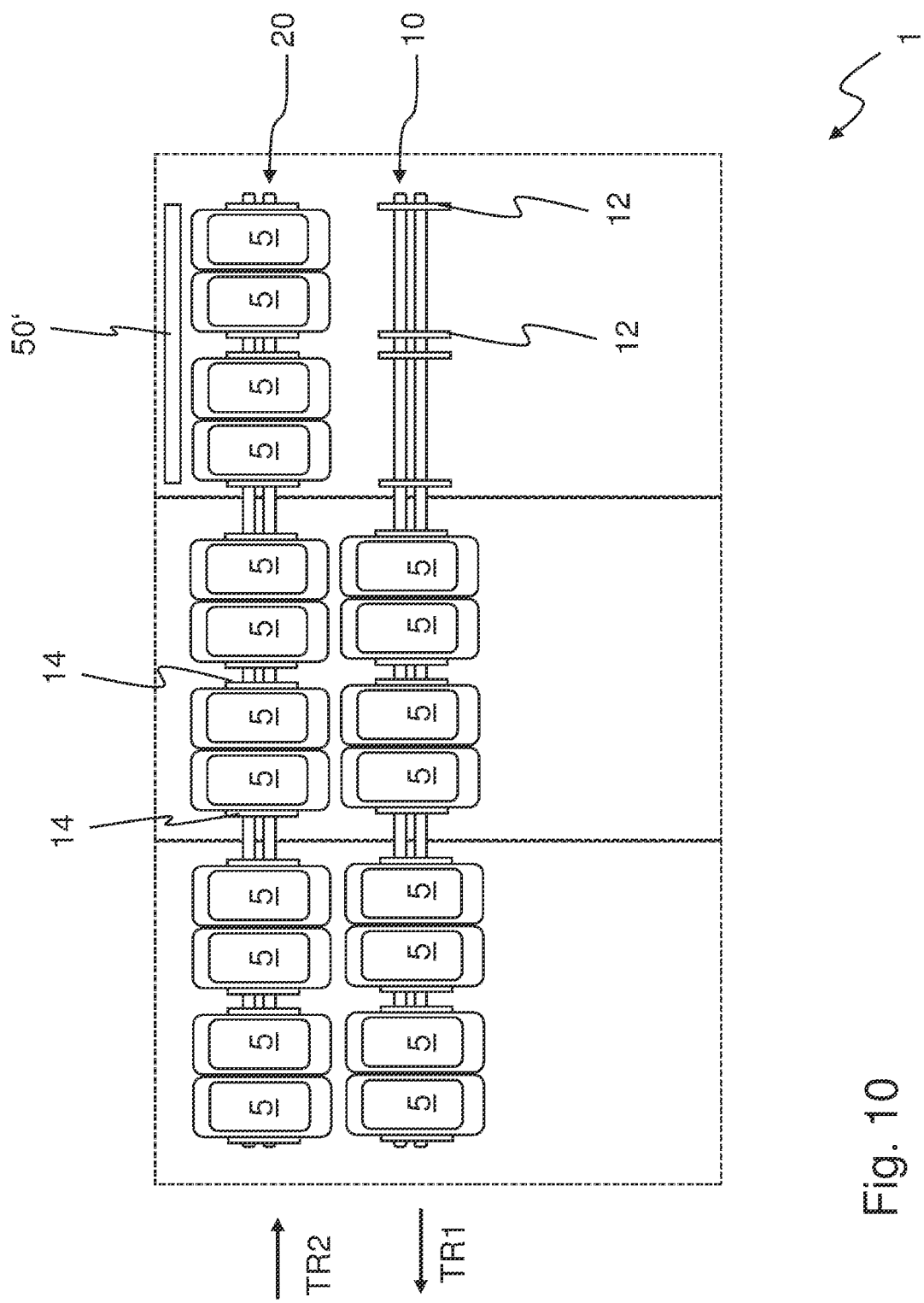
FIGS. 10 to 12 each illustrate a further functional principle, as it may be provided for in various embodiments of a packaging system according to the invention. Furthermore.

The schematic view of FIG. 10 shows another functional principle as it may be provided for various embodiments of a packaging system 1 according to the invention. A comparison of the functional principle as shown in FIG. 10 with the functional principle as shown in FIGS. 5 to 9 shows, that in FIG. 10 two format parts 5 instead of just one format part 5 are clamped between directly successive retaining devices 12, which retaining devices 12 are fixed to the first conveying device 10 or which retaining devices 12 are part of the first conveying device 10. In this way, two outer packages 3 can be deposited respectively on the two format parts 5, which two format parts 5 are clamped between directly successively arranged retaining devices 12 of the first conveying device 10, which directly successively arranged retaining devices 12 are fixed to the first conveying device 10 or are designed as a component of the first conveying device 10. The second conveying device 20 also respectively holds two format parts 5 instead of just one format part 5 in a clamping manner between directly successive retaining devices 14, which retaining devices 14 are fixed to the second conveying device 20 or are part of the second conveying device 20. For the return of format parts 5, the further pusher bar 50' can be brought into contact with several or in the present case four format parts 5 and move the several or presently four format parts 5 from the second conveying device 20 in the direction of the first conveying device 10 in a pushing manner.

Figure 11:
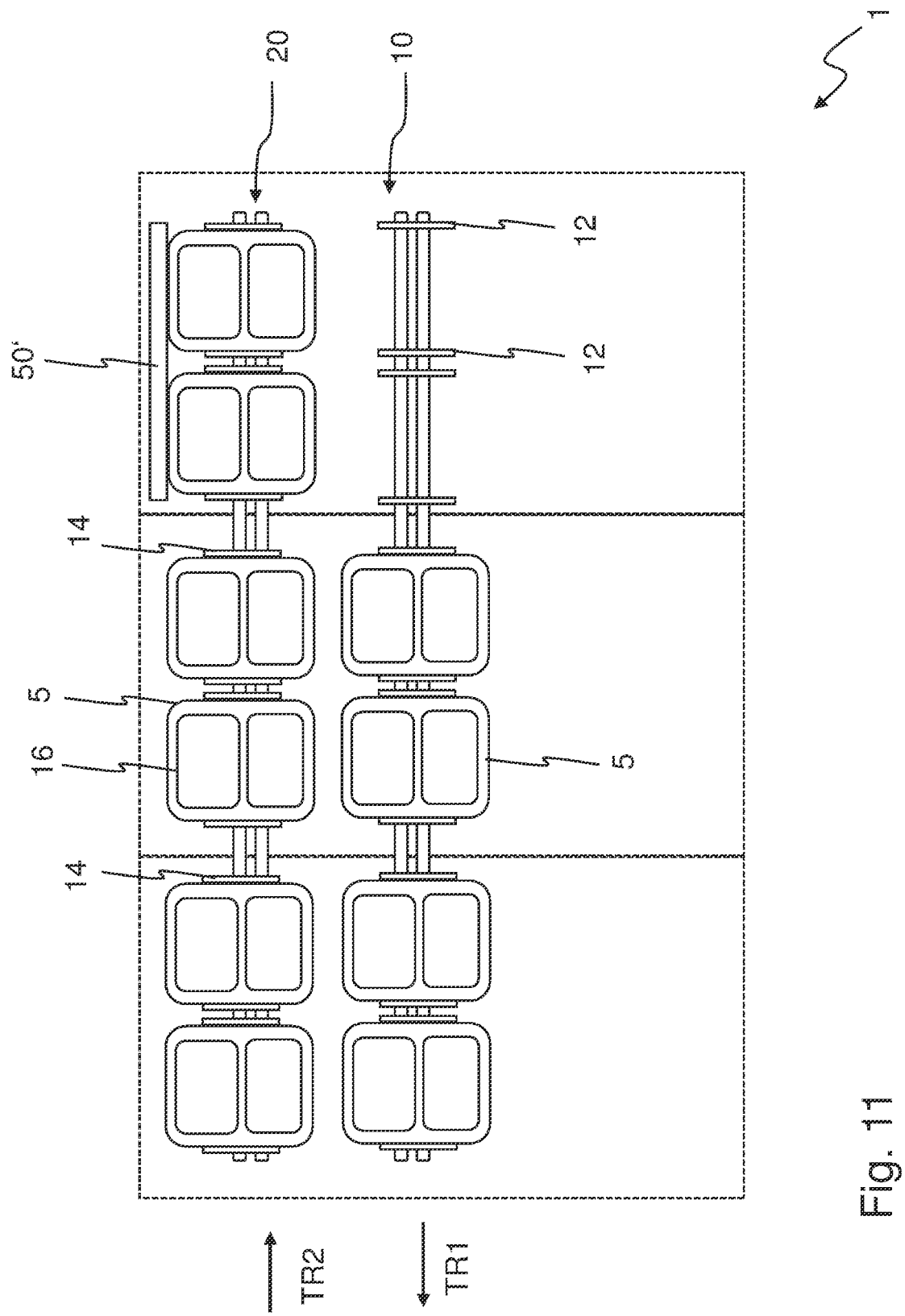

The schematic view of FIG. 11 shows a further functional principle, as it can be provided for various embodiments of a packaging system 1 according to the invention. According to the exemplary embodiments shown in FIGS. 1 to 3, FIG. 4 and FIGS. 5 to 9, the embodiment according to FIG. 11 shows that a single format part 5 each is fixed in a clamping manner between retaining devices 12 or 14, which are arranged directly in succession and fixed to the conveying devices 10 or 20. However, the format parts 5 according to FIG. 11 differ from the format parts 5 according to the previous embodiments. Thereby a format part 5 according to FIG. 11 can be used to receive several outer packages 3 or in the present case two outer packages 3 each, so that the several or presently two outer packages 3 each, which are received by the respective format part 5, are held in a form-fitting manner by the respective format part 5.

Figure 12:
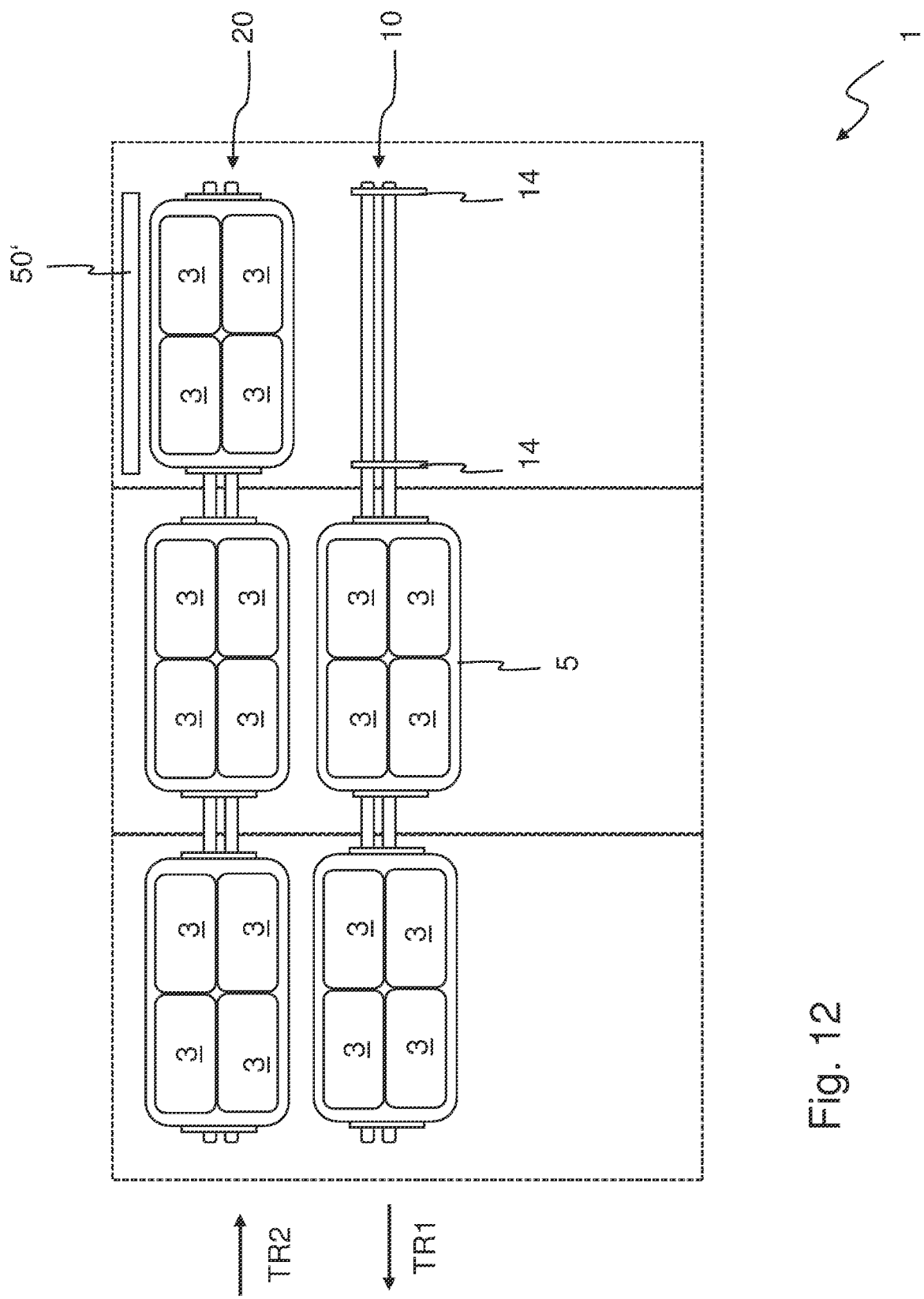

The schematic view of FIG. 12 shows another functional principle as it may be provided for various embodiments of a packaging system 1 according to the invention. In accordance with the exemplary embodiments shown in FIGS. 1 to 3, FIG. 4 and FIGS. 5 to 9 and FIG. 11, in FIG. 12 a single format part 5 is held each in a clamping manner between directly successively arranged retaining devices 12 and 14, which retaining devices 12 and 14 are fixed to the conveying devices 10 and 20. By a format part 5 as shown in FIG. 12, several outer packages 3 or in the present case four outer packages 3 each can be received, so that the several or presently four outer packages 3 each, which are received by the respective format part 5, are held in a form-fitting manner by the respective format part 5.

Figure 13:
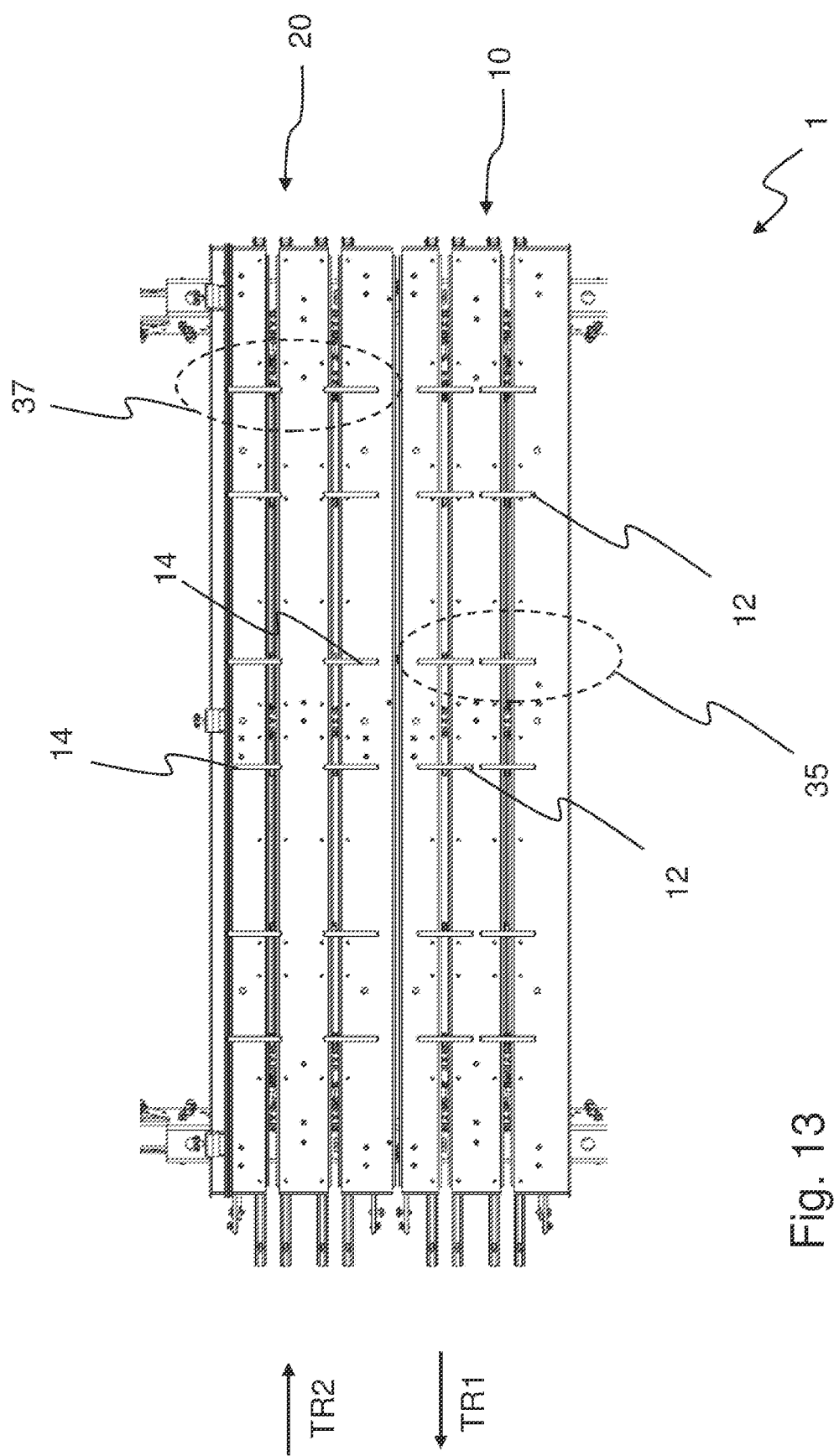
FIGS. 13 and 14 show a schematic view of a first and a second conveying device, as may be provided for various embodiments of a packaging system according to the invention and for implementation in various embodiments of the method according to the invention.
Figure 14:
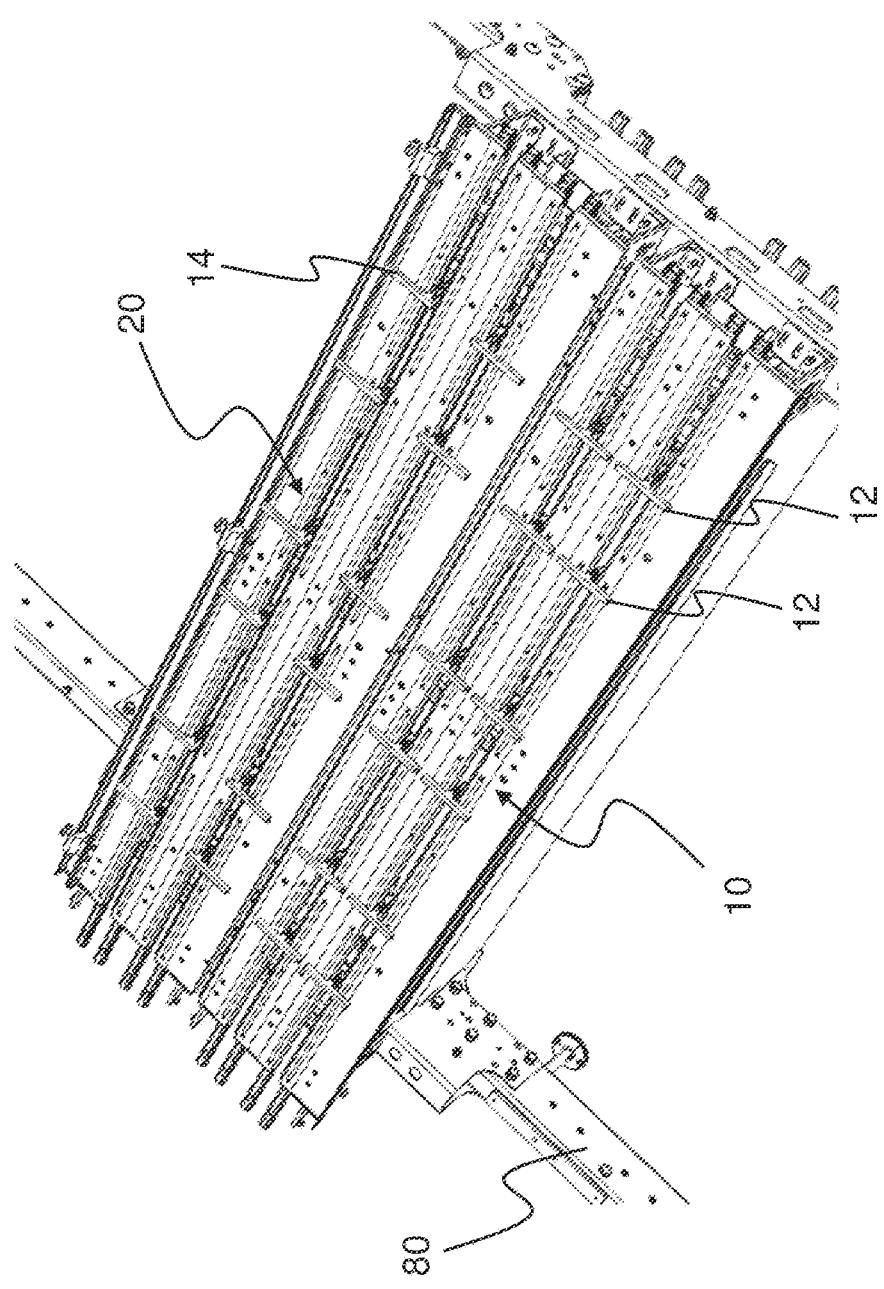

FIGS. 13 and 14 show a schematic view of a first and a second conveying device 10 and 20, as they may be provided in various embodiments of a packaging system 1 according to the invention and for implementation in various embodiments of the method according to the invention. The first and the second conveying devices 10 and 20 are arranged next to each other. A transport direction TR1 for the format parts 5 of the first conveying device 10 and a transport direction TR2 for the format parts 5 of the second conveying device 20 are oriented parallel to each other. The first conveying device 10 has two chain drives and/or belt drives running parallel to each other, whereby several retaining devices 12 are arranged on the two chain drives and/or belt drives running in parallel to each other.

A respective retaining device 12 arranged on a first chain drive and/or belt drive of the first conveying device 10 and a respective retaining device 12 arranged on a second chain drive and/or belt drive of the first conveying device 10 form a pair 35 of retaining devices 12, which pair 35 of retaining devices 12 is in front flush contact or in rear flush contact with a respective format part 5 for fixing a respective format part 5 to the first conveying device 10 in a clamping manner. Likewise, the second conveying device 20 has two chain drives and/or belt drives running parallel to each other, whereby several retaining devices 14 are arranged on the two chain drives and/or belt drives arranged parallel to each other. A respective retaining device 14 arranged on a first chain drive and/or belt drive of the second conveying device 20 and a respective retaining device 14 arranged on a second chain drive and/or belt drive of the second conveying device 20 form a pair 37 of retaining devices 14, which pair 37 of retaining devices 14 is in front flush contact or in rear flush contact with a respective format part 5 (cf. FIG. 15) for fixing a respective format part 5 onto the second conveying device 20 in a clamping manner.

FIG. 14 shows a schematic perspective view of the embodiment of a first conveying device 10 and a second conveying device 20 according to FIG. 13. In FIG. 14 it can be seen that the first conveying device 10 and the second conveying device 20 are attached to a supporting structure 80 or can be attached to a supporting structure 80.

Figure 15:
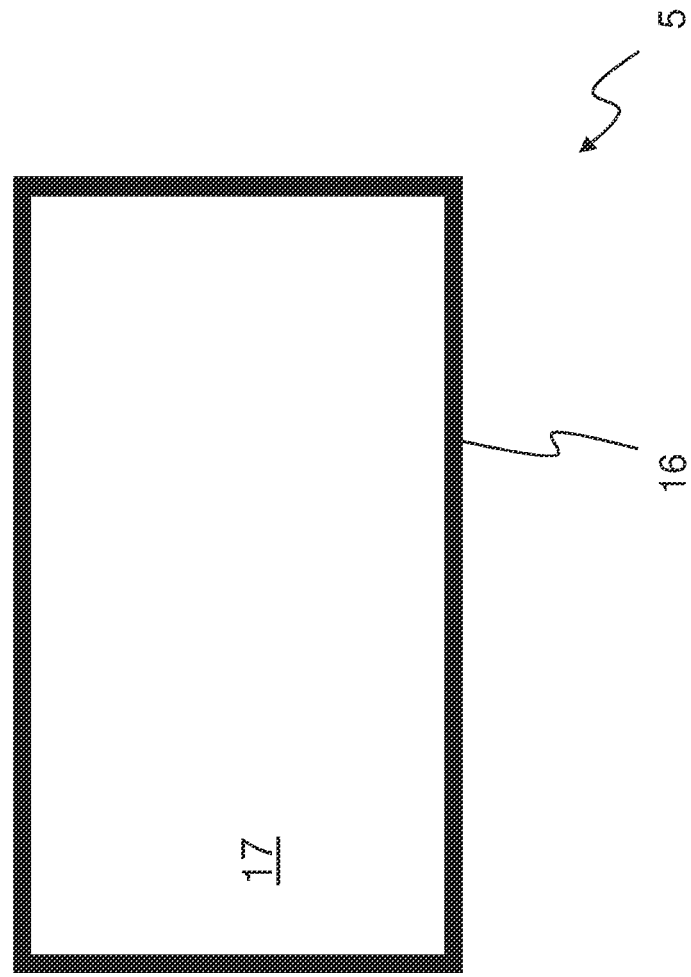
FIG. 15 shows a schematic top view of a format part, as it may be intended for various embodiments of the packaging system according to the invention and for implementation in various embodiments of the method according to the invention.

FIG. 15 shows a schematic top view of a format part 5, as it may be intended for various embodiments of the packaging system 1 according to the invention as well as for the implementation in various embodiments of the method according to the invention. The format part 5 of the embodiment according to FIG. 5 forms a standing surface 17, on which a respective outer package 3 stands after being received by the format part 5. Furthermore, the format part 5 comprises a marginal area 16. The marginal area 16 protrudes from the standing surface 17 in a direction opposite to the picture area. A respective outer package 3 can be received by the format part 5 in a form-fitting or essentially form-fitting manner, whereby the respective outer package 3 received by the format part 5 and standing on the standing surface 17 is in surface contact with the marginal area 16 and/or is in the immediate vicinity of the marginal area 16. Other embodiments are also conceivable, in particular according to FIGS. 11 and 12, in which the format part 5 forms several peripheral areas for the positive reception of several outer packages 3. The format part 5 according to FIG. 15 or other embodiments of a format part 5 can be made, for example, of aluminum and/or plastic.

The invention was described with reference to a preferred embodiment. However, it is conceivable for a person skilled in the art that modifications or alterations of the invention can be made without leaving the scope of protection of the claims below.

REFERENCE CHARACTER LIST 1 packaging system
2 article
4 beverage containers
5 format part
5' empty format part
6 compartment
8 packaging unit
9 support bar
10 first conveying device
12 retaining device (first conveying device)
14 retaining device (second conveying device)
15 handling device
16 marginal area
17 standing surface
20 second conveying device
30 First magazine
35 Pair of retaining devices (first conveying device)
37 pair of retaining devices (second conveying device)
40 second magazine
50 pusher bar
50' another slider bar
60 infeed
62 lane separator
64 horizontal conveying device
70 outfeed conveyor belt
80 supporting structure
TR1 transport direction (first conveying device)
TR2 transport direction (second conveying device)

The invention claimed is:

1. A method for packaging articles (2), comprising:
moving a plurality of outer packages (3) over a first conveying device (10) and then moving the outer packages (3) over a second conveying device (20), wherein the second conveying device (20) is located next to the first conveying device (10),
inserting articles (2) into an outer package (3) while the outer package (3) is located on the first conveying device (10) or while the respective outer package (3) is located on the second conveying device (20),
receiving each outer package (3) on the first conveying device (10) on a format part (5) and, together with their format part (5), transferring each outer package (3) to the second conveying device (20),
removing each of the outer packages (3), which continue to be arranged on the format parts (5) until then, from the format parts (5), together with the inserted articles (2), to an outfeed conveyor (70), and then returning the format parts (5) to the first conveying device (10) for subsequent receipt of outer packages (3),
wherein:
a) the first conveying device (10) comprises a plurality of circulatingly guided retaining devices (12), wherein at least one format part (5) is fixed in a clamping manner to the first conveying device (10) via two respective directly successive circulatingly guided retaining devices (12) of the first conveying device (10), or wherein:
b) the second conveying device (20) has a plurality of circulatingly guided retaining devices (14), wherein at least one format part (5) transferred from the first conveying device (10) to the second conveying device

(20) is fixed in a clamping manner to the second conveying device (20) via two respective directly successive circulatingly guided retaining devices (14), and wherein the receiving step further comprises receiving outer packages (3) on a plurality of different format parts (5), wherein the different format parts (5) are adapted to different dimensions of different outer packages (3) and which different format parts (5) can be selectively arranged on the first conveying device (10) depending on the respective dimensions of the outer packages.

2. The method according to claim 1, wherein the format parts (5) together with their received outer package (3) are transposed from the first conveying device (10) to the second conveying device (20), or wherein the format parts (5) together with their received outer package (3) are pushed from the first conveying device (10) to the second conveying device (20).

3. The method of claim 2, wherein the format parts (5) hold the outer package (3) in a form-fitting manner until the outer package (3) is removed from the format part (5).

4. The method of claim 3, wherein, depending on the dimensions of the outer packages (3) to be received by the format parts (5), selecting a specific format parts (5) from a plurality of different format parts (5) so that the selected specific format parts (5) corresponds to the outer packages (3) to be received.

5. The method of claim 4, wherein format parts (5) are moved along a first transport direction (TR1) via the first conveying device (10) and wherein format parts (5) transferred onto the second conveying device (20) are moved along a second transport direction (TR2), wherein the first transport direction (TR1) and the second transport direction (TR2) are parallel and opposite to one another.

6. A packaging system (1) for articles (2), comprising:
a first conveying device (10) and a second conveying device (20), each for moving outer packages (3) and which are arranged next to each other, and
at least one handling device (15) for inserting articles (2) into outer packages (3), wherein a working area of the at least one handling device (15) extends over the first conveying device (10) or the second conveying device (20),
a plurality of format parts (5), which format parts (5) can receive outer packages (3) and are detachable from the first conveying device (10) and the second conveying device (20),
at least one manipulation device, which can transfer format parts (5), together with received outer packages (3), from the first conveying device (10) to the second conveying device (20), wherein the second conveying device (20) returns format parts (5) from the second conveying device (20) to the first conveying device (10), and
an outfeed conveyor (70), which can receive outer packages (3), together with the inserted articles (2),
wherein:
a) the first conveying device (10) has a plurality of circulatingly guided retaining devices (12), wherein at least one format part (5) can be fixed in a clamping manner to the first conveying device (10) via two respective directly successive circulatingly guided retaining devices (12) of the first conveying device (10), or wherein:
b) the second conveying device (20) has a plurality of circulatingly guided retaining devices (14), wherein at least one format part (5) transferred from the first conveying device (10) to the second conveying device (20) can be fixed in a clamping manner to the second conveying device (20) via two respective directly successive circulatingly guided retaining devices (14), and
wherein the plurality of format parts (5) comprise a plurality of different format parts (5), wherein the different format parts (5) have different dimensions corresponding to different outer packages (3).

7. The packaging system according to claim 6, wherein:
a) the at least one manipulation device can transpose format parts (5), together with the received outer packages (3), from the first conveying device (10) onto the second conveying device (20), or wherein:
b) the at least one manipulation device can push format parts (5), together with the received outer packages (3), from the first conveying device (10) onto the second conveying device (20).

8. The packaging system of claim 6, wherein the format parts (5) are designed to hold the received outer packages (3) in a form-fitting manner.

9. The packaging system of claim 8, wherein the format parts (5) each comprise a circumferential edge region (16) forming a lateral boundary for a respectively received outer package (3).

10. The packaging system of claim 9, further comprising a plurality of different format parts (5), which each have different dimensions and which can be selectively arranged on the first conveying device (10), depending on dimensions of the outer packages (3) to be received.

11. The packaging system of claim 10, wherein the format parts (5) are made of a light metal or of a composite made of metal and plastic.

12. The packaging system of claim 6, wherein the first conveying device (10) transports format parts (5) in a first transport direction (TR1), and the second conveying device (20) transports format parts (5) in a second transport direction (TR2), wherein the first transport direction (TR1) and the second transport direction (TR2) are parallel and opposite to one another.

13. A method for packaging articles (2), comprising:
moving a plurality of outer packages (3) over a first conveying device (10) and then moving the outer packages (3) over a second conveying device (20), wherein the second conveying device (20) is located next to the first conveying device (10),
inserting articles (2) into an outer package (3) while the outer package (3) is located on the first conveying device (10) or while the respective outer package (3) is located on the second conveying device (20),
receiving a plurality of each outer package (3) on the first conveying device (10) on a format part (5) and, together with their format part (5), transferring the outer packages (3) to the second conveying device (20), so that the plurality of outer packages (3) are held in a form-fitting manner by the format part (5),
removing each of the outer packages (3), which continue to be arranged on the format parts (5) until then, from the format parts (5), together with the inserted articles (2), to an outfeed conveyor (70), and then returning the format parts (5) to the first conveying device (10) for subsequent receipt of outer packages (3),
wherein:
a) the first conveying device (10) comprises a plurality of circulatingly guided retaining devices (12), wherein at least one format part (5) is fixed in a clamping manner to the first conveying device (10) via two respective directly successive circulatingly guided retaining devices (12) of the first conveying device (10), or wherein:

b) the second conveying device (20) has a plurality of circulatingly guided retaining devices (14), wherein at least one format part (5) transferred from the first conveying device (10) to the second conveying device (20) is fixed in a clamping manner to the second conveying device (20) via two respective directly successive circulatingly guided retaining devices (14).

* * * * *